United States Patent [19]

Paxon et al.

[11] Patent Number: 4,937,635
[45] Date of Patent: Jun. 26, 1990

[54] MULTIPLE IMAGE REGISTRATION

[75] Inventors: James F. Paxon; Robert C. Storey, both of Rochester, N.Y.

[73] Assignee: Eastman Kodak Company, Rochester, N.Y.

[21] Appl. No.: 425,273

[22] Filed: Oct. 23, 1989

[51] Int. Cl.⁵ .............................................. G03G 15/01
[52] U.S. Cl. .................................... 355/326; 355/208; 355/210
[58] Field of Search ............... 355/326, 208, 327, 200, 355/210, 243, 202

[56] References Cited

U.S. PATENT DOCUMENTS 3,702,482 11/1972 Dolcimascolo et al. .
3,914,047 10/1975 Hunt, Jr. et al. .
4,025,186 5/1977 Hunt et al. .
4,477,176 10/1984 Russel .
4,679,096 7/1987 Nagashima .
4,693,592 9/1987 Kurpan .................... 355/208
4,712,906 12/1987 Bothner et al. .
4,821,066 4/1989 Foote et al. .
4,860,059 8/1989 Terashita ................ 355/208 X
4,884,106 11/1989 Harris .

Primary Examiner—Fred L. Braun
Assistant Examiner—Thu Dang
Attorney, Agent, or Firm—Milton S. Sales

[57] ABSTRACT

Reproduction apparatus wherein registration errors in image formation are corrected in response to an examination of enlarged reproductions of reproductions so as to make the appropriate adjustments in timing of process steps, giving a registration suitable for very high quality multiple image reproduction.

13 Claims, 4 Drawing Sheets

MULTIPLE IMAGE REGISTRATION

BACKGROUND OF THE INVENTION

1. Technical Field

This invention relates generally to reproduction apparatus, such as for example copiers and nonimpact printers of the type which forms a plurality of images on an endless image member and then transfers those images in registration to a transfer surface. The invention is particularly usable in color reproduction.

2. Background Art

U.S. Pat. No. 4,712,906 issued Dec. 15, 1987 to R. Borruso and J. Butler shows a color printer having an electrophotographic endless web entrained about a series of rollers. Electrostatic latent images representing color components of a desired multicolor image are formed by uniformly charging the web and exposing it using an LED printhead. Consecutive latent images (or pairs of images) are toned with different colored toners, and the toned images are transferred in registration to a transfer surface brought into contact repeatedly with the images by a transfer drum. The single-color images are referred to herein as "color separation" images.

Registration of the color separation images is achieved in part by an encoder which triggers exposure of the web according to the angular position of a roller associated with the printhead. The printhead roller is connected by gearing or a timing belt to the transfer drum so that the transfer surface is presented in substantial registration with the beginning of the first image. The accuracy of placement of subsequent images on top of the first image is dependent upon consistency in the movement of the web between the printhead and the transfer station. With this structure, small errors associated with drum diameter differences, errors in the drive train between the transfer drum and the printhead roller, and the like, cause registration errors which accumulate over the course of formation of a set of multicolor images.

U.S. Pat. No. 4,025,186 shows an endless web electrophotographic member having a series of perforations along one edge which perforations are sensed to control actuation of work stations along the web. U.S. Pat. No. 4,477,176 shows a similar approach for controlling superimposed multiple image apparatus, for example, a multicolor image copier.

U.S. Pat. No. 4,821,066 discloses a nonimpact color printer having a web upon which two or more images are formed in response to an electronic signal and transferred in registry. Actuation of the printhead is controlled in response to sensing the leading or trailing edge of each perforation as it passes a predetermined position associated with the print head and the transfer surface.

In commonly assigned U.S. patent application Ser. No. 07/239,885, flash exposure of each frame is delayed by an independently adjustable duration after sensing an indicia. An operator or service representative installing a new web runs color reproductions using an appropriate color original, examines the reproductions for color registration and makes the appropriate adjustments in the delay time to give high quality. As good as this apparatus is, it is only as accurate as the resolution powers of the error detection means; be it the operator or an apparatus. While these errors are relatively small and not unacceptable for much color work, they prevent forming images of highest quality with ordinary error detection methods.

DISCLOSURE OF INVENTION

It is an object of this invention to provide a reproduction apparatus and process, such as for example, a color copier or printer, generally of the type having an endless image member upon which two or more images are formed for transfer in registry, but in which registration of those images is much improved.

These and other objects are accomplished by providing a means for controlling actuation timing of the reproduction process. Errors in image formation are corrected in response to an examination of enlarged reproductions of reproductions for image registration so as to make the appropriate adjustments in timing of process steps, giving a registration suitable for very high quality multiple image reproduction.

According to one embodiment of the present invention, reproduction apparatus of the type described includes means for actuating exposure, and means for positioning the transfer surface relative to the developed images to locate the developed images on the transfer surface. Means are provided for producing a test reproduction of superposed images having fiduciaries in a predetermined relative alignment when the images are in proper registration. An enlarged copy of the test reproduction is made, from which correction signal characteristic of the scaled misregistration from the predetermined relative alignment of the fiduciaries of the enlarged copy is produced. The correction signal is used for adjusting at least one of said exposure actuating means and said positioning means for at least one of the superposed images to at least partially correct the misregistration.

According to a preferred embodiment of the present invention, the means for producing a test reproduction is operable to substantially align fiduciary images when the images are in proper registration. The correction signal producing means includes means for resolving and measuring the amount of misregistration from the predetermined relative alignment of the fiduciaries of the enlarged copy, and the resolving and measuring means comprise a digitizing tablet. The exposing means includes an electronically controlled printhead of the type which emits activating radiation along a line transverse to said direction of motion of the image member and said adjusting means includes means for timing said emission.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

Figure 1:
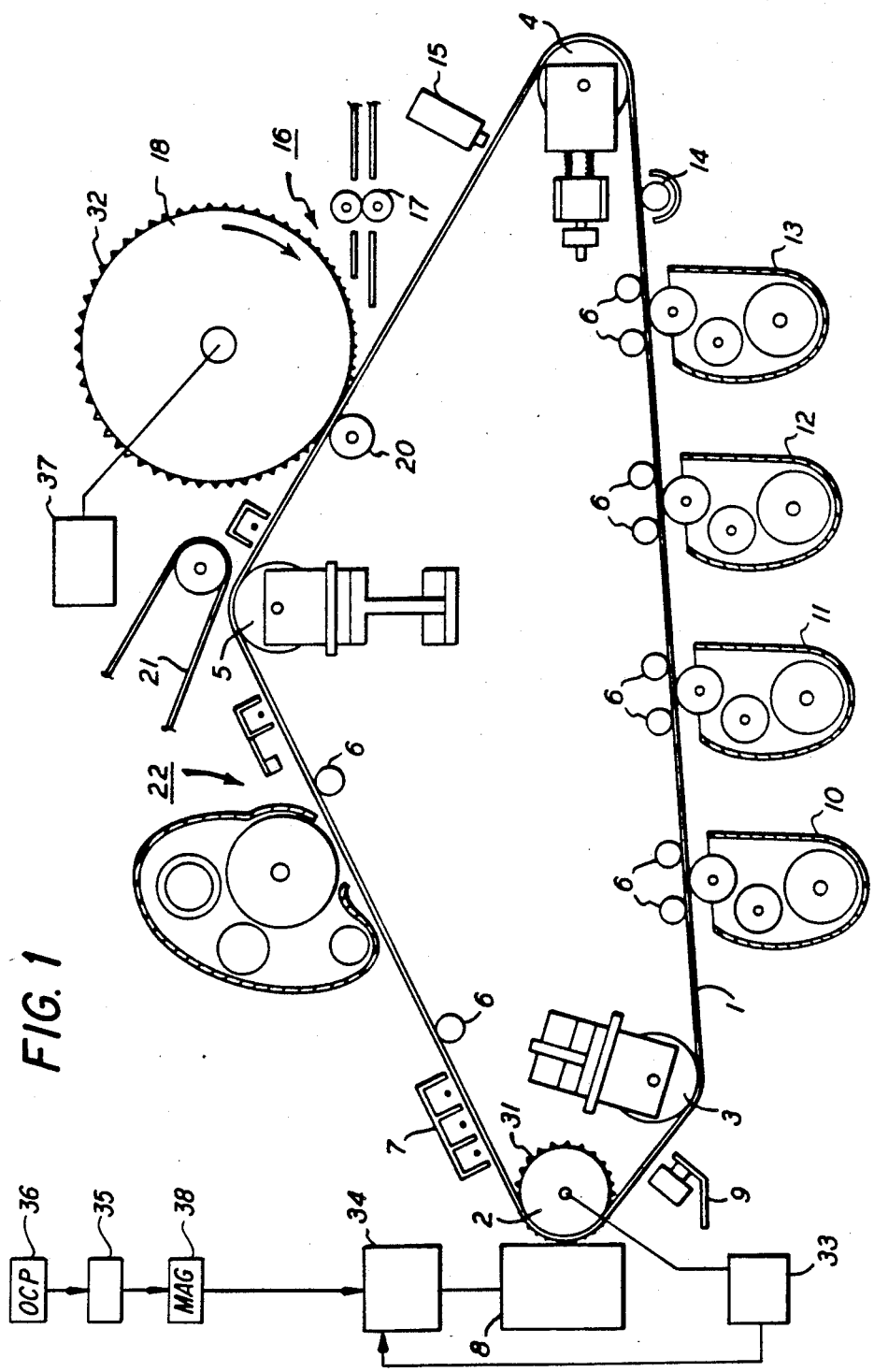
FIG. 1 is a schematic side view of a reproduction apparatus constructed according to the invention, with many parts eliminated for clarity of illustration.

According to FIG. 1, a film core portion of reproduction apparatus such as, for example, a copier or printer, includes an image member such as endless movable electrophotographic web 1 entrained about a series of primary rollers 2, 3, 4 and 5 and other supporting structure, for example, skis 6.

Web 1 is driven through a series of electrophotographic stations, generally well-known in the art. A uniform charge is deposited on the web 1 at a charging station 7. The uniformly-charged web moves around printhead roller 2 which is directly opposite an exposure means, such as an LED printhead 8 for forming a series of electrostatic images on image member 1. The LED printhead is commercially available from a variety of sources and is presently being used as an exposure device for digital reproduction apparatus. It is electronically controlled and emits activating radiation along a line transverse to the direction of motion of the electrophotographic web. Image formation, of course, need not be by LED printhead. Other electronic sources of image data can make equally significant use of this invention, for example, a laser scanning device may be used. Similarly, the process need not be electrophotographic, for example, image formation can be by ion emission, as is well known in the art, thereby eliminating charging station 7 and greatly simplifying web 1.

Following exposure, the web moves into operative relation with an electrometer 9 which senses either the level of charge originally placed on the web or the level of a charge existing after exposure of the web by LED printhead 8. Web 1 then moves into operative relationship with means for developing the electrostatic images, such as a series of toner stations 10, 11, 12 and 13. Each image created by exposure using LED printhead 8 is toned by one of the stations 10, 11, 12 or 13. After being toned, the web passes a magnetic scavenger 14 which removes excess iron particles picked up in the toning process as is well known in the art. After the electrostatic image has been toned, the web passes under a densitometer 15 which measures the density of the toner image or of a specially toned area or areas to be used to control one or more aspects of the electrostatographic process. The toner image then proceeds to a transfer station 16 where the developed images are transferred to a transfer surface. The transfer surface may be one surface of a receiver sheet which has been delivered by a feeding mechanism 17 to the transfer station.

The transfer station includes a large transfer drum 18 which includes a means such as vacuum holes for securing the copy sheet thereto for repeated presentations to web 1; see U.S. Pat. No. 4,712,906. The transfer drum cooperates with web 1 to incrementally bring the transfer surface and the toner image into transfer relation so that the toner image is transferred to the transfer surface. As is well known in the art, this is generally accomplished under the presence of an electric field which may be created by biasing the transfer drum compared to a conductive layer of the web or to a backing roller 20 for the web; see, for example, U.S. Pat. No. 3,702,482.

When the apparatus is operating in a multi-image mode, such as for example a multicolor mode, consecutive images or pairs of images are toned with different colored toners using the different toning stations 10-13. These consecutive images are transferred in registry to the transfer surface as it repeatedly is brought into transfer relation with web 1 by drum 18. After the transfer operation is complete, the receiver sheet is allowed to follow the web by removing the vacuum holding it to drum 18. The receiver sheet is separated from the web with the aid of a sheet transport mechanism 21, and is transported to a fuser. The web is then cleaned at a cleaning station 22.

The quality of the resulting multicolor image on the copy sheet is very much dependent upon the registration of the images at transfer station 16. This, in turn, is dependent upon coordination between LED printhead 8, moving web 1, and transfer drum 18. Registration error of even a small magnitude results in loss of resolution and may result in a shift in the hue of colors that result from the combination of two different toners. Original location of the copy sheet on transfer drum 18 by sheet feeding mechanism 17 is considerably less critical since that affects only the location of the image on the sheet itself and not the quality of the image itself.

Figure 2:
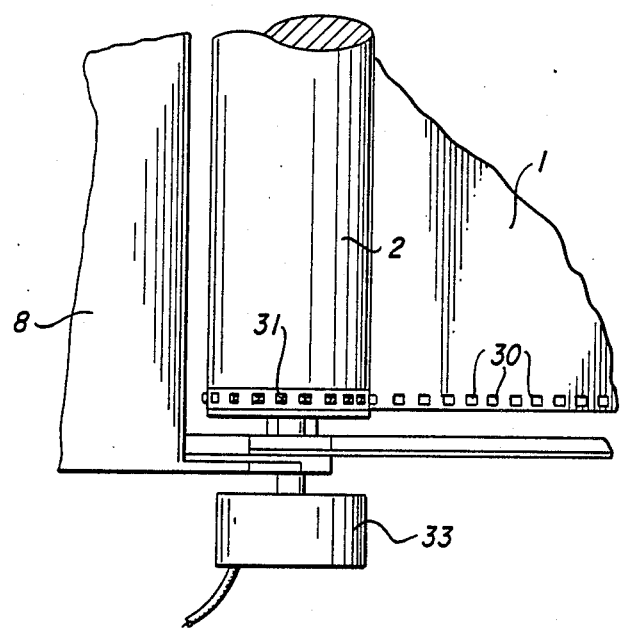
FIG. 2 is a top view of printhead and printhead roller portions of the apparatus shown in FIG. 1.

Referring to FIG. 2, coordination between printhead, web and transfer drum is provided, in part, by placing a series of perforations 30 along one edge of web 1. A sprocket 31 is positioned to engage the perforations and rotate with the web as it moves through operative relationship with printhead 8. An encoder 33 monitors the angular position of printhead sprocket 31 creating a signal indicative of that position. It is also indicative of the location of the edge of the perforation in contact with the sprocket. This signal is fed to means for actuating printhead 8, such as a printhead drive and control unit 34 which also receives an image input signal from a data input device 35 which may be, for example, a scanner, a computer, a data storage device or the like. The printhead drive and control unit 34 actuates LED printhead 8 according to the angular position of printhead sprocket 31. It thus exposes a portion of the web associated with the in-track separation between consecutive engaged edges of the perforation.

Printhead drive and control unit 34, which includes a microprocessor, uses the information derived from encoder 33 and sensing perforations 30 to drive the LEDs at the appropriate times to create the electrostatic latent image at the desired place in the image areas. Using this information, the apparatus will also adjustably control other functions of the apparatus, including actuation of the toner stations 4, 5 and 6, feeding of the receiving sheet from receiving sheet supply 10, separation of the receiving sheet from the transfer drum, and the like.

Such encoder arrangements prevent irregularities in an image due to substantial variations in web speed at the printhead. However, errors of a smaller nature continue to show up with such devices when images are superimposed at the transfer station. While they are not noticeable for most color work, registration error of as little as 0.001 inch result in a noticeable loss of resolution or change of hue from inexact superposition of images.

However, misregistrations in the order of 0.001 inches are difficult to measure, especially in a customer or manufacturing assembly area. Generally, while machine-to-machine misregistration varies due to additive tolerance "stack-up" differences, each machine generally exhibits systematic and predictable misregistration.

This problem has been solved in the apparatus shown in FIG. 1 by permitting the operator or service representative to adjust the timing of the actuation of the LEDs separately for each image area on web 1 and/or the positioning of the transfer surface relative to the developed images. This adjustment may be accomplished by a mechanical mechanism, knobs, set screws or the like, or by means of a digitizing stylus, all as indicated at operator control panel 36 of FIG. 1.

In operation, the operator makes a test reproduction of superposed images having fiduciaries in a predetermined relative alignment when the images are in proper registration. Preferable, the predetermined alignment is alignment to the fiduciaries. Preferably, each image is a different color. Since misregistrations of only 0.001 have a significant adverse effect on color image quality, corrections that should be made are difficult to make, even with the aid of inspection of the test reproduction under optical magnification.

Figure 3:
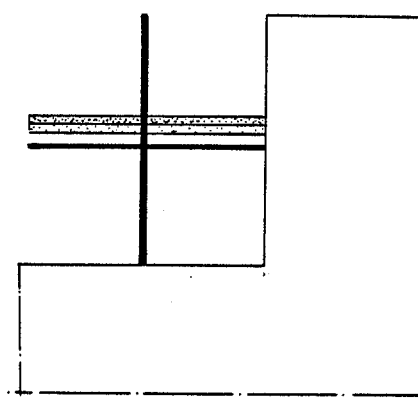
FIG. 3 is a view of a test reproduction with an enlarged image of fiduciaries.

According to the illustrated embodiment of the present invention, the test reproduction is optically scanned by data input device 35. The scanned image is electronically enlarged by conventional magnification apparatus 38 (see for example U.S. Pat. No. 4,679,096) to enlarge the image so that the amount of misregistration of the fiduciaries can be resolved and measured. FIG. 3 is an illustration of an enlarged copy of a pair of fiduciaries, showing misregistration in the vertical direction. Once the misregistration is measured, a correction signal is generated and scaled to the amount of enlargement. The scaled correction signal is used to adjust the software "start of image" command for the appropriate color separation and/or to adjust the software command for positioning of the transfer surface relative to the developed images. Measurement of the enlarged misregistration distance and calculation and entry of the correction signal may be manual or automatic.

In a manual arrangement, if one or more of the color components making up the final multicolor image appears to be separated from the other components, the operator adjusts the appropriate set screw to return the LED timing to its proper setting. For example, if a color reproduction shows the cyan-colored image and the yellow colored image in good registration but the magenta image slightly ahead of the other two images, the set screw for the magenta exposure is adjusted to change the timing of the green color separation exposure.

In theory, it is not necessary that a specific color be associated with a specific image area. The set screws could be numbered 1 through 6, one for each image frame (denoting the image frames, in order, after the master perforation) since they are basically adjusted only for variations in the location of the flash perforations. However, it is easier for the service person to recognize which set screws should be adjusted if the set screws and, therefore, the image areas are dedicated to a particular color. More complicated systems are possible. For example, a four color system, cyan, magenta, yellow and black, may also use a six image area web. One approach to proper adjustment in this instance, is to operate the apparatus as a three color apparatus during the set up. Once the set screws are fine tuned, the apparatus is indifferent to what color images and toners are used with any particular image area.

In an automatic arrangement of measurement and entry of misregistration data, the enlarged copy of the test reproduction may be placed on a digitizer tablet. The operator may then locate each fiduciary by touching with a pointer or stylus. Again, once the misregistration is measured, a correction signal is generated and scaled to the amount of enlargement so that the scaled correction signal is used to adjust the software "start of image" command for the appropriate separation and/or to adjust the software command for positioning of the transfer surface relative to the developed images.

The apparatus shown in FIG. 1 need not be of the type which a transfer sheet is secured to the surface of the transfer drum 18. Other systems are known in which three or four consecutive color images are transferred directly to the surface of drum 18 to form a multicolor image on the surface which is then retransferred to a transfer sheet at a position either remote from the transfer drum-web nip or at the nip itself. The registration features disclosed herein are usable with such systems. Similarly, the transfer drum may be of a size large enough to hold two multicolor images on its surface or on the surface of two receiving sheets; see, for example, U.S. Pat. No. 4,712,906 to Bothner et al. These registration systems could be used with such apparatus, the pitch of the images then being consecutive pairs of images rather than consecutive images.

Figure 4:
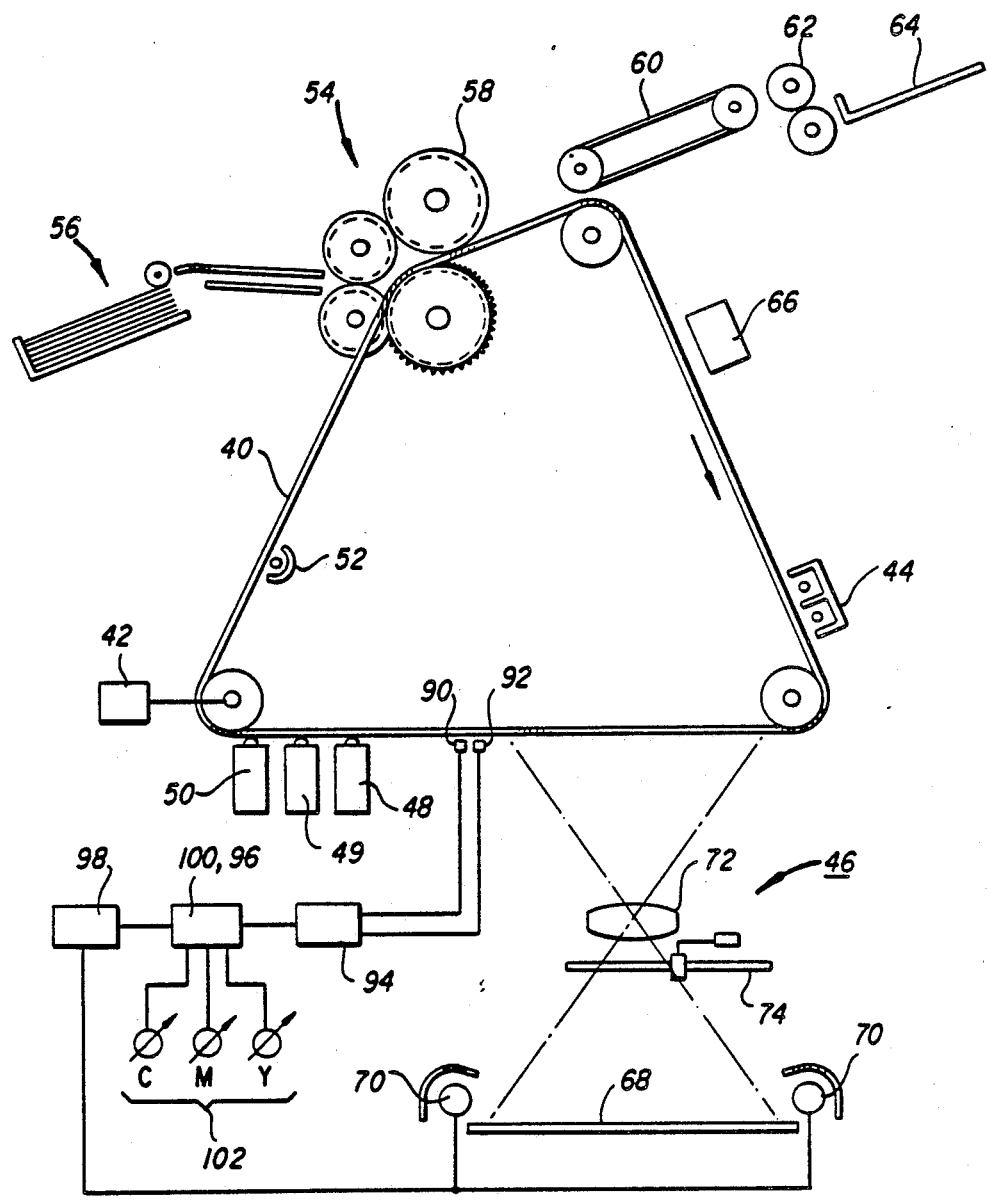
FIG. 4 is a schematic side view of a color electrostatographic apparatus constructed according to the invention.

Although this system is described for digital reproduction apparatus, the approach can also work from optical wherein a delay circuit for adjusting a flash actuation circuit of an optical copier. Such a copier is shown in FIG. 4. An electrophotosensitive web 40 is driven by a motor 42 and is uniformly charged at a charging station 44, consecutive image areas are exposed to color separation images of an original at an exposure station 46 to form electrostatic latent images representative of the color separations, and the images are toned by appropriate colored toners at toning stations 48, 49 and 50.

Some of the forces holding the toner to the web 40 are eliminated by an erase lamp 52. The toner images then proceed to a transfer device 54 where they are transferred in registry to a receiving surface to form a multicolor image. More specifically, a receiver sheet is fed from a receiving sheet supply 56 to transfer device 54 where the sheet is held on the periphery of a transfer drum 58. The transfer drum is rotated at a speed bringing a transfer surface of the receiver sheet into repeated transfer relation with the toner images to transfer consecutive toner images in registry to the transfer surface of the receiver sheet. After the desired number of toner images have been transferred to the transfer surface the receiver sheet is separated from or no longer held by transfer drum 58 and follows web 40 until picked off by a receiver sheet transport mechanism 60 which transports it to a roller fuser 62 and hence to an output hopper 64. The web is then cleaned at a cleaning station 66 for reuse. This general process as described is well known in the art and utilized by apparatus available commercially.

Registration of the toner images on the transfer surface is dependent primarily upon two stations, the exposure station and the transfer station. A given point on the receiving surface, as it is rotated by transfer drum 58 into transfer relation with the toner images, must receive toner from the same points in the consecutive images.

The exposure station is similar to that shown in U.S. Pat. No. 4,477,176 of Russel. A color original 68 is illuminated at an exposure position by flash lamps 70. A color separation of the original is projected by a lens 72 onto the charged web. Color separation is provided by a filter wheel 74, as is known in the art.

Figure 5:
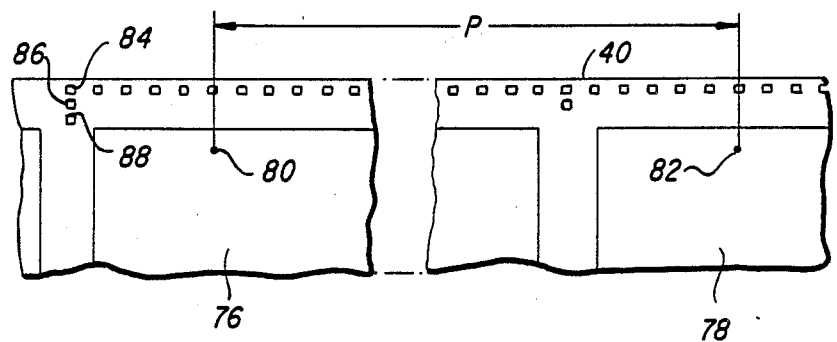
FIG. 5 is a top view of an edge of an endless web usable in the apparatus shown in FIG. 4.

Referring to FIG. 5 web 40 is divided into discrete image areas 76, 78 which are not necessarily physically defined. Although an individual color separation image need not be placed at a specific place in any image area, it is important that the pitch of the latent images be consistent with the pitch of the rotating receiving surface associated with transfer drum 58. For example, if a point in the original is imaged on consecutive image areas 76 and 78 as points 80 and 82, toner applied at those two points at the toner stations must be transferred to the same point on the receiving surface associated with transfer drum 58. The distance between the points 76 and 78 on web 40 is the pitch P of the two images.

U.S. Pat. Nos. 3,914,047 and 4,025,186 both to Hunt, et al are representative of a number of references which show timing flash exposure using timing marks for perforations on a web. Somewhat similar to those prior systems, web 40 as shown in FIG. 5 contains sprocket perforations 84 and flash perforations 86, and a single master perforation 88. A flash perf sensor 90 (FIG. 1) senses the flash perforations and a master perf sensor 92 senses the master perforation. The sprocket perforations may also be sensed. In general, the information derived from sensing the flash and master perforations is fed into appropriate circuitry which combines that information with its own timing circuitry and actuates flash lamps 70 at the appropriate time to create the electrostatic latent image at the desired place in the image areas. Using this information, the apparatus will also control other functions of the apparatus, including actuation of the toner stations 48-50, feeding of the receiver sheet from sheet supply 56, separation of the receiving sheet from the transfer drum, and the like.

Figure 6:
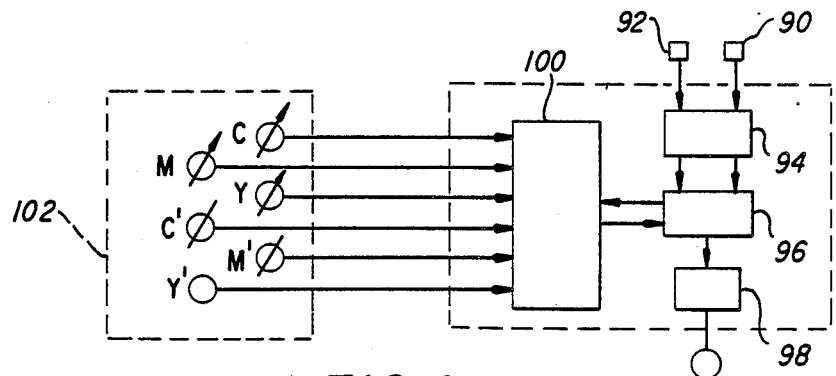
FIG. 6 is a schematic circuit diagram of the flash actuation circuitry for the apparatus shown in FIG. 4.

Referring to FIG. 6 the circuitry associated with flashing lamps 70 in response to sensing flash and master perforations is shown. Sensors 90 and 92 can be optical sensors for sensing the leading or trailing edge of a perforation, mechanical sensors as shown in the Hunt, et al patents referred to above or any other suitable sensor for sensing indicia on a web. The sensor is actuated by the perforation, preferably an edge of the perforation, passing a given point thereby creating a signal which is amplified and processed by a signal conditioning amplifier 94 and fed to a microprocessor 96 using interrupt and multiplexing logic. Microprocessor 96 then controls actuation of flash lamps 70 through a flash illumination power supply 98. A delay is built into the system by connecting a multiplexing and delay timing circuit 100 to microprocessor 96.

The service person may adjust the delay between the sensing of the flash perforations and actuation of flash lamps 70 separately for each image area on the web. This adjustment may be accomplished by a mechanical mechanism, knobs, set screws or the like which control the settings on real time delay adjusting potentiometers 102 in FIGS. 5 and 6. In turn, timing circuit 100 is adjustable by the potentiometers 102. In essence, a flash perforation is sensed by sensor 90 and flash lamp 70 is actuated after a delay controlled by circuit 100 as adjusted for each flash perforation by potentiometers 102. In order to relate the potentiometers to a particular frame and thereby to a particular color, input from master perf sensor 92 is also fed to microprocessor 96. This input permits the logic and control circuitry to maintain each frame dedicated to a particular potentiometer for adjustment.

Referring to FIG. 6 and assuming filter wheel 74 to have red, green and blue filters to control the projection of comparable separation images on the web, and assuming that the web is of a length to accommodate six image areas, six separate adjustment devices are provided. As shown in FIG. 6 they are labeled C, M, Y, C', M' and Y'.

In operation, a service person makes a test reproduction from a color test target with adjustment means 102 at a particular value, for example, each flash may be set to occur, say, 200 milliseconds after sensing each flash perforation.

The resulting test reproduction is then copied at, say 400× magnification to determine the registration of the images produced. If one or more of the color components making up the final multicolor image appears to be separated from the other components, the service person adjusts the appropriate set screw in adjustment means 102. For example, if a color reproduction made using the first three image areas following the master perforation shows the cyan-colored image and the yellow colored image in good registration but the magenta image slightly ahead of the other two images, the set screw noted as M in adjustment means 102 is adjusted to lengthen the time between sensing of the appropriate flash perforation and the flash for the green color separation exposure.

The second series of set screws C', M' and Y' can also be adjusted accordingly using a second color reproduction made with the fourth, fifth and sixth image areas.

In theory, it is not necessary that a specific color be associated with a specific image area. The set screws could be numbered 1 through 6, one for each image frame (denoting the image frames, in order, after the master perforation) since they are basically adjusted only for variations in the location of the flash perforations. However, it is easier for the service person to recognize which set screws should be adjusted if the set screws and, therefore, the image areas are dedicated to a particular color. More complicated systems are possible. For example, a four color system, cyan, magenta, yellow and black, may also use a six image area web. One approach to proper adjustment in this instance, is to operate the apparatus as a three color apparatus during the set up. Once the set screws are fine tuned for each flash perforation, the apparatus is indifferent to what color images and toners are used with any particular image area. Obviously, other schemes could be used for setting the potentiometers 102.

Although this system is described using a timing delay circuit for measuring the delay imposed on the flash actuation circuit, the approach can also work from an encoder (such as shown in FIG. 1) which monitors the angular position of one of the rollers. In this alternative, the delay is in terms of encoder pulses and is not strictly a time but is a length of web after the flash perf is sensed.

Figure 7:
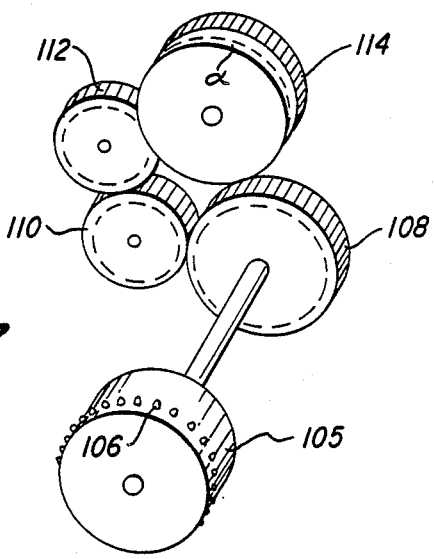
FIG. 7 is a perspective view of a drive train of a transfer apparatus shown as part of the apparatus of FIG. 4.

Assuming that the toned color images leaving toner stations 48-50 have the proper pitch, transfer drum 58 must still be rotated properly to assure that each point on the receiving surface receives comparable points from each toner image. Referring to FIG. 7, a sprocket 105 includes teeth 106 which engage sprocket perforations 84 in web 40. Sprocket 105 is driven by web 40 maintaining contact between teeth 106 and the trailing edge of sprocket perforations 84. Sprocket 105 also drives transfer drum 58 through a gear train that includes a sprocket gear 108 coaxial with and driven with and by sprocket 105, two intermediate gears 110 and 112, and a drum gear 114 coaxial with and driven with drum 58.

Sprocket 105 and gears 108, 110, 112 and 114 are sized to assure that the same teeth in each component are supplying the driving force for rotating transfer drum 58 for comparable points in successive images. Preferably, sprocket 108 has a circumference effectively equal to the pitch P of the images as described with respect to FIG. 5. Similarly, each of gears 110 and 112 have circumferences which when divided into the circumference of sprocket 105 give an integer.

Gear 114 must have the same circumference as transfer drum 58 which of necessity is equal to the pitch of the images. With this transfer device constructed accordingly, each point on the receiving surface will be driven by the same teeth throughout the gear train and the sprocket for each image being transferred. Thus, if there is any imprecision in any tooth in any of the gears, that imprecision will be repeated at the same place in the transfer process for each image. Although a slight distortion in the length of the document may occur at that point, there will be no distortion in image sharpness or hue as a result of the respective images not coinciding. The slight distortion in length of an otherwise high quality color image is not noticeable.

We claim:

1. Reproduction apparatus of the type having an image member movable between (1) exposure means for forming a series of electrostatic images on the image member, (2) means for developing the electrostatic images, and (3) means for transferring the developed images to a transfer surface in superposition; said reproduction apparatus comprising:
    means for actuating the exposure means;
    means for positioning the transfer surface relative to the developed images to locate the developed images on the transfer surface;
    means for producing a test reproduction of superposed images having fiduciaries in a predetermined relative alignment when the images are in proper registration;
    means for producing an enlarged copy of the test reproduction;
    means for producing a correction signal characteristic of the scaled misregistration from the predetermined relative alignment of the fiduciaries of the enlarged copy; and
    means, responsive to the correction signal, for adjusting at least one of said exposure actuating means and said positioning means for at least one of the superposed images to at least partially correct the misregistration.

2. Reproduction apparatus as set forth in claim 1 wherein said means for producing a test reproduction is operable to substantially align fiduciary images when the images are in proper registration.

3. Reproduction apparatus as set forth in claim 1 wherein said correction signal producing means includes means for resolving and measuring the amount of misregistration from the predetermined relative alignment of the fiduciaries of the enlarged copy.

4. Reproduction apparatus as set forth in claim 3 wherein said resolving and measuring means comprise a digitizing tablet.

5. Reproduction apparatus as set forth in claim 1 wherein the exposing means includes an electronically controlled printhead of the type which emits activating radiation along a line transverse to said direction of motion of the image member and said adjusting means includes means for timing said emission.

6. Reproduction apparatus as set forth in claim 1 wherein:
    said exposure actuating means includes (1) means for sensing indicia on the image member and (2) means for actuating said exposure means in response to sensing said indicia, said actuating means including delay means for delaying the actuation of said exposure means; and
    said adjusting means includes means for adjusting said delay for actuation of one image independently of any delay associated with other images intended to define the same ultimate composite image.

7. Color reproduction apparatus of the type having an image member movable between (1) exposure means for forming a series of electrostatic images on the image member, (2) means for applying toner of different color to the electrostatic images, and (3) means for transferring the toned images to a transfer surface in superposition; said reproduction apparatus comprising:
    means for actuating the exposure means;
    means for positioning the transfer surface relative to the toned images to locate the toned images on the transfer surface;
    means for producing a test reproduction of superposed images having fiduciaries in a predetermined relative alignment when the images are in proper registration;
    means for producing an enlarged copy of the test reproduction;
    means for producing a correction signal characteristic of the scaled misregistration from the predetermined relative alignment of the fiduciaries of the enlarged copy; and
    means, responsive to the correction signal, for adjusting at least one of said exposure actuating means and said positioning means for at least one of the superposed images to at least partially correct the misregistration.

8. Color reproduction apparatus as set forth in claim 7 wherein said means for producing a test reproduction is operable to substantially align fiduciary images when the images are in proper registration.

9. Color reproduction apparatus as set forth in claim 7 wherein said correction signal producing means includes means for resolving and measuring the amount of misregistration from the predetermined relative alignment of the fiduciaries of the enlarged copy.

10. Color reproduction apparatus as set forth in claim 9 wherein said resolving and measuring means comprise a digitizing tablet.

11. Color reproduction apparatus as set forth in claim 7 wherein the exposing means includes an electronically controlled printhead of the type which emits activating radiation along a line transverse to said direction of motion of the image and said adjusting means includes means for timing said emission.

12. The process of adjusting the registration of reproduction apparatus of the type having an image member movable between (1) exposure means for forming a series of electrostatic images on the image member, (2) means for developing the electrostatic images, and (3) means for transferring the developed images to a transfer surface in superposition; said process comprising the steps of:
- actuating the exposure means;
- positioning the transfer surface relative to the developed images to locate the developed images on the transfer surface;
- producing a test reproduction of superposed images having fiduciaries in a predetermined relative alignment when the images are in proper registration;
- producing an enlarged copy of the test reproduction;
- producing a correction signal characteristic of the scaled misregistration from the predetermined relative alignment of the fiduciaries of the enlarged copy; and
- adjusting, in response to the correction signal, at least one of said exposure actuating means and said positioning means for at least one of the superposed images to at least partially correct the misregistration.

13. The process defined in claim 12 wherein the step of producing a correction signal includes resolving and measuring the amount of misregistration from the predetermined relative alignment of the fiduciaries of the enlarged copy.

* * * * *